United States Patent
Zattin et al.

(10) Patent No.: US 10,435,833 B2
(45) Date of Patent: *Oct. 8, 2019

(54) LAUNDRY WASHING MACHINE AND METHOD FOR CONTROLLING A LAUNDRY WASHING MACHINE

(71) Applicant: Electrolux Appliances Aktiebolag, Stockholm (SE)

(72) Inventors: Andrea Zattin, Solesino (IT); Elisa Stabon, Gorizia (IT)

(73) Assignee: Electrolux Appliances Aktiebolag (SE)

( * ) Notice: Subject to any disclaimer, the term of this patent is extended or adjusted under 35 U.S.C. 154(b) by 193 days.

This patent is subject to a terminal disclaimer.

(21) Appl. No.: 15/108,895

(22) PCT Filed: Jul. 7, 2014

(86) PCT No.: PCT/EP2014/064413
§ 371 (c)(1),
(2) Date: Jun. 29, 2016

(87) PCT Pub. No.: WO2015/101424
PCT Pub. Date: Jul. 9, 2015

(65) Prior Publication Data
US 2016/0333513 A1    Nov. 17, 2016

(30) Foreign Application Priority Data

Dec. 30, 2013   (WO) ................. PCT/EP2013/078133
Dec. 30, 2013   (WO) ................. PCT/EP2013/078134
Dec. 30, 2013   (WO) ................. PCT/EP2013/078135

(51) Int. Cl.
*D06F 37/00*   (2006.01)
*D06F 39/00*   (2006.01)
(Continued)

(52) U.S. Cl.
CPC ............ *D06F 39/007* (2013.01); *B01J 39/04* (2013.01); *C02F 1/42* (2013.01); *C02F 1/4691* (2013.01);
(Continued)

(58) Field of Classification Search
CPC ...... D06F 39/02; D06F 39/005; D06F 39/007; D06F 33/02; D06F 35/005; D06F 35/006; D06F 2214/00
See application file for complete search history.

(56) References Cited

U.S. PATENT DOCUMENTS 5,167,722 A * 12/1992 Pastryk ................. D06F 35/006
                                                                    134/33
5,272,892 A * 12/1993 Janutka ................. D06F 39/087
                                                                    68/12.02
(Continued)

FOREIGN PATENT DOCUMENTS

DE           3519831 A1    12/1986
DE     102013206359 A1    10/2014
(Continued)

OTHER PUBLICATIONS

U.S. Appl. No. 15/108,814 Entitled: Laundry Washing Machine and Method for Controlling a Laundry Washing Machine International Application No. PCT/EP2013/078133.
(Continued)

*Primary Examiner* — David G Cormier
(74) *Attorney, Agent, or Firm* — RatnerPrestia

(57) ABSTRACT

Laundry washing machine (1) having an outer casing (2), a washing tub (3), arranged inside the casing (2), a rotatable drum (4), arranged in axially rotating manner inside the washing tub (3) and designed to receive laundry to be washed, and a detergent dispensing assembly (12), designed for supplying laundry detergent into the washing tub (3).

(Continued)

The washing machine also has a water softening system (14), designed to receive fresh water from a water mains (13) and reduce the hardness degree of the fresh water in order to supply softened water the detergent dispensing assembly (12) and/or to the washing tub (3), during one or more softened water laundry washing phases, and a control panel (28) configured to allow operator to input information associated with washing performance/s. A controller (15) is configured to control the water softening system (14) in order to perform a washing program comprising one or more softened water laundry washing phases based on input washing performance/s information.

21 Claims, 7 Drawing Sheets

(51) Int. Cl.
| | | |
|---|---|---|
| *D06F 33/02* | (2006.01) | |
| *C02F 1/469* | (2006.01) | |
| *D06F 37/04* | (2006.01) | |
| *D06F 39/02* | (2006.01) | |
| *B01J 39/04* | (2017.01) | |
| *C02F 1/42* | (2006.01) | |
| *G05B 19/042* | (2006.01) | |
| *C02F 101/10* | (2006.01) | |

(52) U.S. Cl.
CPC ............ *D06F 33/02* (2013.01); *D06F 37/04* (2013.01); *D06F 39/005* (2013.01); *D06F 39/02* (2013.01); *G05B 19/0426* (2013.01); *C02F 2101/10* (2013.01); *C02F 2303/22* (2013.01); *C02F 2307/12* (2013.01); *G05B 2219/2633* (2013.01)

(56) References Cited

U.S. PATENT DOCUMENTS

| | | | |
|---|---|---|---|
| 6,169,964 | B1 | 1/2001 | Aisa et al. |
| 6,557,382 | B1* | 5/2003 | Koike ................ D06F 39/007 68/13 A |
| 2005/0103631 | A1 | 5/2005 | Freydina et al. |
| 2005/0252538 | A1 | 11/2005 | Vernon et al. |
| 2009/0114598 | A1 | 5/2009 | van Kralingen et al. |
| 2010/0287709 | A1* | 11/2010 | Doyle ................ A47L 15/0023 8/137 |
| 2012/0174631 | A1 | 7/2012 | Cho et al. |
| 2012/0203391 | A1 | 8/2012 | Lee |
| 2015/0368848 | A1 | 12/2015 | Del Pos et al. |

FOREIGN PATENT DOCUMENTS

| | | |
|---|---|---|
| EP | 0467028 A1 | 1/1992 |
| EP | 2486180 B1 | 8/2012 |

OTHER PUBLICATIONS

U.S. Appl. No. 15/108,816 Entitled: Laundry Washing Machine With Water Softening System and Method for Controlling a Laundry Washing Machine International Application No. PCT/EP2013/078135.

U.S. Appl. No. 15/108,815 Entitled: Laundry Washing Machine With Water Softening System and Method for Controlling a Laundry Washing Machine International Application No. PCT/EP2013/078134.

U.S. Appl. No. 15/108,985 Entitled: Laundry Washing Machine and Method for Controlling a Laundry Washing Machine International Application No. PCT/EP2014/064414.

Non Final Office Action for U.S. Appl. No. 15/108,816, dated Jul. 2, 2018, 21 pages.

Final Office Action for U.S. Appl. No. 15/108,816, dated Oct. 11, 2018, 17 pages.

Non Final Office Action for U.S. Appl. No. 15/108,815, dated Dec. 14, 2018, 32 pages.

Non Final Office Action for U.S. Appl. No. 15/108,816, dated Feb. 21, 2019, 17 pages.

Australian Examination Report for Australian Application No. 2013409579, dated Feb. 4, 2019, 4 pages.

Final Office Action for U.S. Appl. No. 15/108,815, dated Mar. 21, 2019, 18 pages.

Non Final Office Action for U.S. Appl. No. 15/108,814, dated Jun. 14, 2019, 11 pages.

Non Final Office Action for U.S. Appl. No. 15/108,985, dated Jun. 14, 2019, 9 pages.

Notice of Allowance for U.S. Appl. No. 15/108,816, dated Jul. 17, 2019, 14 pages.

* cited by examiner

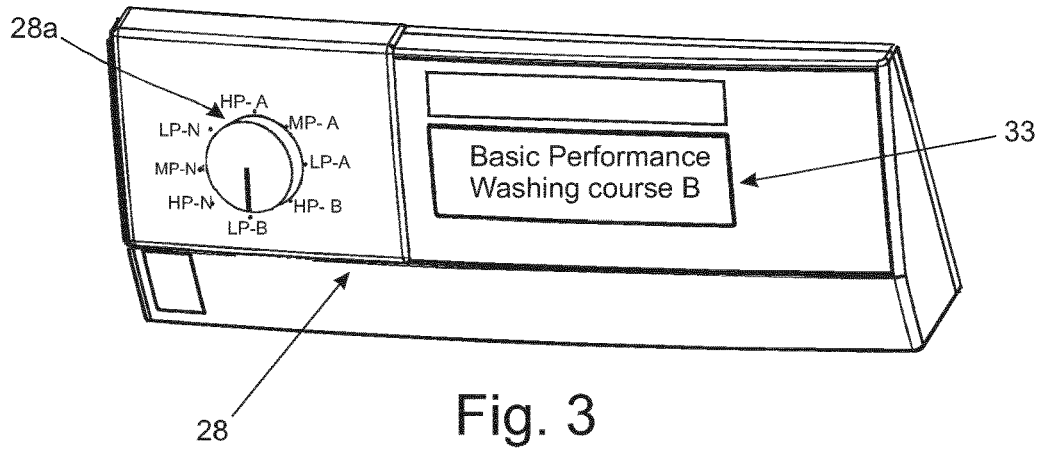

Fig. 3

| User selection \ imp. perf. washing prog. | Main Wash phase | Secondary laundry wash phases | | | | |
|---|---|---|---|---|---|---|
| | | First Rinse | Second Rinse | .... Rinse | .... Rinse | Last Rinse |
| Basic Perf. washing program A | Mix. Water | Fresh Water | Fresh Water | Fresh Water | Fresh Water | Fresh Water |
| Intermed. Perf. washing program A | Soft. Water | Mix. Water | Fresh Water | Fresh Water | Fresh Water | Fresh Water |
| High Perf. washing program A | Soft. Water | Soft. Water | Soft. Water | | | Soft. Water |
| | | | | | | |
| Basic Perf. washing program N | Fresh Water | Mix. Water | Mix. Water | Mix. Water | Mix. Water | Mix Water |
| Interm. Perf. washing program N | Fresh. Water | Soft. Water | Soft. Water | Soft. Water | Soft. Water | Soft. Water |
| Interm. Perf. washing program N | Soft. Water | Mix. Water | Fresh. Water | Mix. Water | Mix. Water | Fresh. Water |
| High Perf. washing program N | Soft. Water | Soft. Water | Soft. Water | Soft. Water | Soft. Water | Soft. Water |

Fig. 4

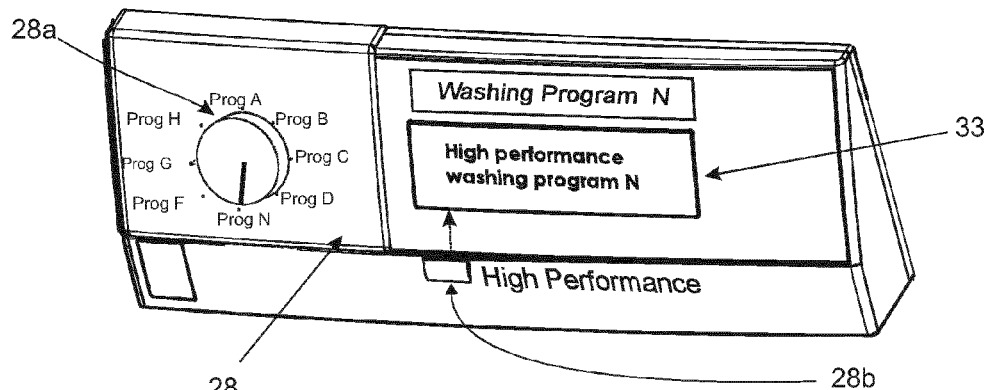

Fig. 7

| washing program / User selection | | Main Wash | Secondary laundry washing phases | | | | |
|---|---|---|---|---|---|---|---|
| | | | First Rinse | Second Rinse | .... Rinse | .... Rinse | Last Rinse |
| program A (knob) | Softned water washing program A | Fresh Water | Mix. Water | Mix Water | Mix Water | Mix Water | Mix Water |
| Button (once) | Int. performance washing program A | Mix Water | Mix. Water | Mix Water | Mix Water | Mix Water | Mix. Water |
| Button (twice) | High performance washing program A | Soft. Water | Mix. Water | Mix Water | Mix Water | Mix Water | Mix. Water |
| | | | | | | | |
| program N(knob) | Softned water washing program N | Soft Water | Mix. Water | Mix. Water | Fresh Water | | Fresh Water |
| Button (once) | Int performance washing program N | Soft Water | Mix. Water | Mix. Water | Mix. water | | Fresh Water |
| Button (twice) | Int performance washing program N | Soft Water | Mix. Water | Mix. Water | Soft water | | Fresh Water |
| Button (N times) | Int performance washing program N | Soft Water | Soft Water | Soft Water | | | Fresh Water |
| | High performance washing program N | Soft Water | Soft Water | Soft Water | | | Soft Water |

Fig. 8

| Phase | cotton cycle full load | cotton cycle full load |
|---|---|---|
| Main wash | Fresh water | Soft water |
| First rinse | Fresh water | Soft water |
| Intermediate rinse | Fresh water | Soft water |
| Last rinse | Fresh water | Soft water |
| Load type | Cotton | Cotton |
| Load amount | 9 kg | 9 kg |
| Washing temperature | 33°C | 33°C |
| Cycle Time duration | 235 min | 235 min |
| detergent amount | 148 g | 148 g |
| Washing performance index | 1,04 | 1,15 |
| Δ Performance index | | 0.11 |

Fig. 10

| Phase | cotton cycle half load | cotton cycle half load |
|---|---|---|
| Main wash | Fresh water | Soft water |
| First rinse | Fresh water | Soft water |
| Intermediate rinse | Fresh water | Soft water |
| Last rinse | Fresh water | Soft water |
| Load type | Cotton | Cotton |
| Load amount | 4.5 kg | 4.5 kg |
| Washing temperature | 27°C | 27°C |
| Detergent amount | 94 g | 94 g |
| Washing performance index | 1,05 | 1,12 |
| Δ Performance index | | 0.07 |

Fig. 11

LAUNDRY WASHING MACHINE AND METHOD FOR CONTROLLING A LAUNDRY WASHING MACHINE

FIELD

The present invention concerns the field of laundry washing techniques.

In particular, the present invention refers to a laundry washing machine and a method for controlling a laundry washing machine provided with a water softener system. More particularly, to a front-loading home laundry washing machine designed to perform improved washing performance programs and control method thereof, to which the following description refers purely by way of example without this implying any loss of generality.

BACKGROUND

Nowadays the use of laundry treatment appliances, such as laundry washing machines, i.e. laundry washing machines which wash and rinse laundry, or laundry washing and drying machines, i.e. laundry washing machines which can also dry laundry, is widespread. In this respect, in the present description, where not stated differently, the term "laundry washing machine" can be referred to a laundry washing machine, or a laundry washing and drying machines.

Laundry washing machines generally comprise an external casing provided with a washing tub which comprises a rotatable perforated drum where the laundry is placed, an electric motor which rotates the drum in the washing tub, a water-detergent supplying system, which supplies fresh water and detergent into the washing tub/drum, and a water draining system which discharges/drains wash water/detergent from the washing tub.

Laundry washing machines further comprise a control panel provided for an user to select a laundry washing program to be performed, such as cotton, delicate wool, silk etc. and a controller configured to control several operating devices/apparatus of the laundry washing machine so as to perform the laundry washing phases based on the selected laundry washing program.

The Applicant conducted an in-depth study with the objective of providing a laundry washing machines which, on the one hand, is designed to provide washing programs characterized by high washing efficiency, hereinafter called "washing performances" and on the other hand allows users to select a level of washing performance i.e. basic, intermediate, high, based on his needs.

SUMMARY OF SELECTED INVENTIVE ASPECTS

According to aspects of the present invention, there is provided a laundry washing machine comprising: an outer casing, a washing tub, which is arranged inside the casing, a rotatable drum, which is arranged in axially rotating manner inside the washing tub and is designed to receive laundry to be washed, a detergent dispensing assembly, which is designed for supplying laundry detergent into the washing tub, the laundry washing machine being characterized by comprising: a water softening system, which is designed to receive fresh water from a water mains and reduce the hardness degree of the fresh water in order to supply softened water or mix water to the detergent dispensing assembly and/or to the washing tub, during one or more softened water laundry washing phase/s or respectively, during one or more mix water laundry washing phase/s; said mix water being a mixture of fresh water and softened water; a control panel which is configured to allow an operator to input information associated with washing performance; electronic control means are configured to control said water softening system in order to perform a washing program comprising one or more softened water laundry washing phases and/or one or more mix water laundry washing phases, based on said input washing performance information.

Preferably, the control panel is configured to allow operator to select a washing program among one or more predetermined improved washing performance programs, wherein improved washing performance programs comprise one or more softened water laundry washing phase/s and/or one or more mix water laundry washing phase/s.

Preferably, said washing program comprises a main laundry wash phase and one or more secondary laundry wash phases following the main laundry wash phase; said main laundry wash phase comprises at least a wetting phase, a maintenance phase and a drain phase; said secondary laundry wash phases comprising one or more rinse phases which start after the end of said drain phase of the main laundry wash phase. Preferably, the improved washing performance programs comprise: performing a fresh water laundry washing phase during the main wash phase, and performing one or more mix water laundry washing phase/s and/or one or more softened water laundry washing phases during the secondary wash phases.

Preferably, said improved washing performance programs comprise: performing a mix or softened water laundry washing phase during the main wash phase, and performing one or more mix or softened or fresh water laundry washing phase/s during the secondary wash phases.

Preferably, an improved washing performance program comprises performing softened water laundry washing phases during the main and the second wash phases. Preferably, the machine comprises memory means containing data relating to one or more improved washing performance programs, said memorized data being indicative of loading of softened water, or fresh water, or mix water to the detergent dispensing assembly and/or the washing tub during laundry washing phases of said improved washing performance programs; said electronic control means being configured to selectively control/activate said water softening system based on the memorized data associated with the selected improved washing performance program.

Preferably, said control panel comprises: a first select part configured to allow operator to input first information indicative of a laundry washing program; a second select part configured to allow operator to input second information indicative of a washing performance level; said electronic control means being configured to determine/set an improved washing performance program to be performed based on received first and second information.

Preferably, said first select part is configured to allow operator to select a laundry washing program among one or more predetermined fresh water laundry washing programs, a fresh water laundry washing program comprising only fresh water washing phases; said second select part being configured to allow operator to input said second information indicative of a level of washing performance; said controller being further configured to set the improved washing performance program based on the selected fresh water laundry washing program and said level of washing performance.

Preferably, said electronic control means are further configured to determine/set the improved washing performance program by replacing one or more fresh water washing phases of the selected fresh water washing program with respective softened water washing phases and/or mix water laundry washing phases, based on said level of washing performance; and control said water softening system in response to the set improved washing performance program.

Preferably, said first select part is configured to allow operator to select a laundry washing program among one or more predetermined softened water laundry washing programs, a softened water laundry washing program comprising at least a softened water laundry washing phase or at least a mix water laundry washing phase; said second select part being configured to allow operator to input said second information indicative of a level of washing performance; said electronic control means being further configured to set the improved washing performance program based on the selected softened water laundry washing program and said level of washing performance.

Preferably, said electronic control means are further configured to determine/set the improved washing performance program by replacing one or more mix or fresh water washing phases of the softened water washing program with respective softened water washing phases ad/or mix water laundry washing phases, based on said level of washing performance; and control said water softening system in response to the set improved washing performance program.

Preferably, the softened water has a reduced hardness degree which is lower than about 15 FH.

Preferably, the softened water has a reduced hardness degree which is lower or equal than about 5 FH.

Preferably, the softened water has a reduced hardness degree which is lower or equal than about 2 FH.

Preferably, the softened water has a reduced hardness degree which is lower or equal than about 1 FH.

Preferably, the mix water has a reduced hardness degree which is greater than, or equal to about 15 FH, and lower than, or equal to about 25 FH.

Preferably, the main laundry wash phase comprises a softened water laundry wash phase; each secondary laundry wash phase comprises: a softened water laundry wash phase or a fresh water laundry wash phase or a mix water laundry wash phase.

Preferably, said water softening system comprises a water-softening agent container, which is filled with a given amount of ion-exchange resins capable to restrain the calcium and/or magnesium ions dissolved in the fresh water flowing across the water-softening agent container, and a regeneration-agent reservoir which is structured for receiving a given amount of salt grains and is designed to uses brine to periodically regenerate said ion-exchange resins contained in said water-softening agent container.

Preferably, the water softening system comprises at least a system based on capacitive deionization technology.

Preferably, the improved washing performance program has a washing efficiency measured/calculated in terms of washing performance index being greater than a washing performance index of a fresh laundry washing program in the same washing conditions cycle.

Preferably, the electronic control means are configured to control said water softening system based on said input washing performance information, in order to supply water to the detergent dispensing assembly and/or to the washing tub during all the washing phases, wherein said supplied water has a hardness degree lower than said fresh water.

BRIEF DESCRIPTION OF THE DRAWINGS

Further characteristics and advantages of the present invention will be highlighted in greater detail in the following detailed description of some of its preferred embodiments, provided with reference to the enclosed drawings. In the drawings, corresponding characteristics and/or components are identified by the same reference numbers. In particular:

FIG. 3 schematically illustrates a first embodiment of an user control panel of the laundry washing machine illustrated in FIG. 1;

FIG. 4 shows an example of a table containing improved performance washing programs selectable by the control panel illustrated in FIG. 3;

FIG. 7 schematically illustrates a third embodiment of an user control panel of the laundry washing machine illustrated in FIG. 1;

FIG. 8 shows an example of a table containing improved performance washing programs selectable by the control panel illustrated in FIG. 7;

FIGS. 10 and 11 are comparison tables which comprise washing parameters concerning a fresh water laundry washing program and corresponding washing parameters of an improved washing performance program.

DETAILED DESCRIPTION OF EXAMPLE EMBODIMENTS

The present invention has proved to be particularly advantageous when applied to a laundry treatment machine, such as laundry washing machines, as described below. It should be understood that although the present invention is described with reference to a laundry washing machine, other applications are contemplated. As can be appreciated, the present invention can be conveniently applied to other laundry treatment appliances, like for example laundry washing and drying machines (called also washer/driers), wherein one or more steps of introducing water and/or steam and/or hot/cool air inside a laundry tub may be required.

Figure 1:
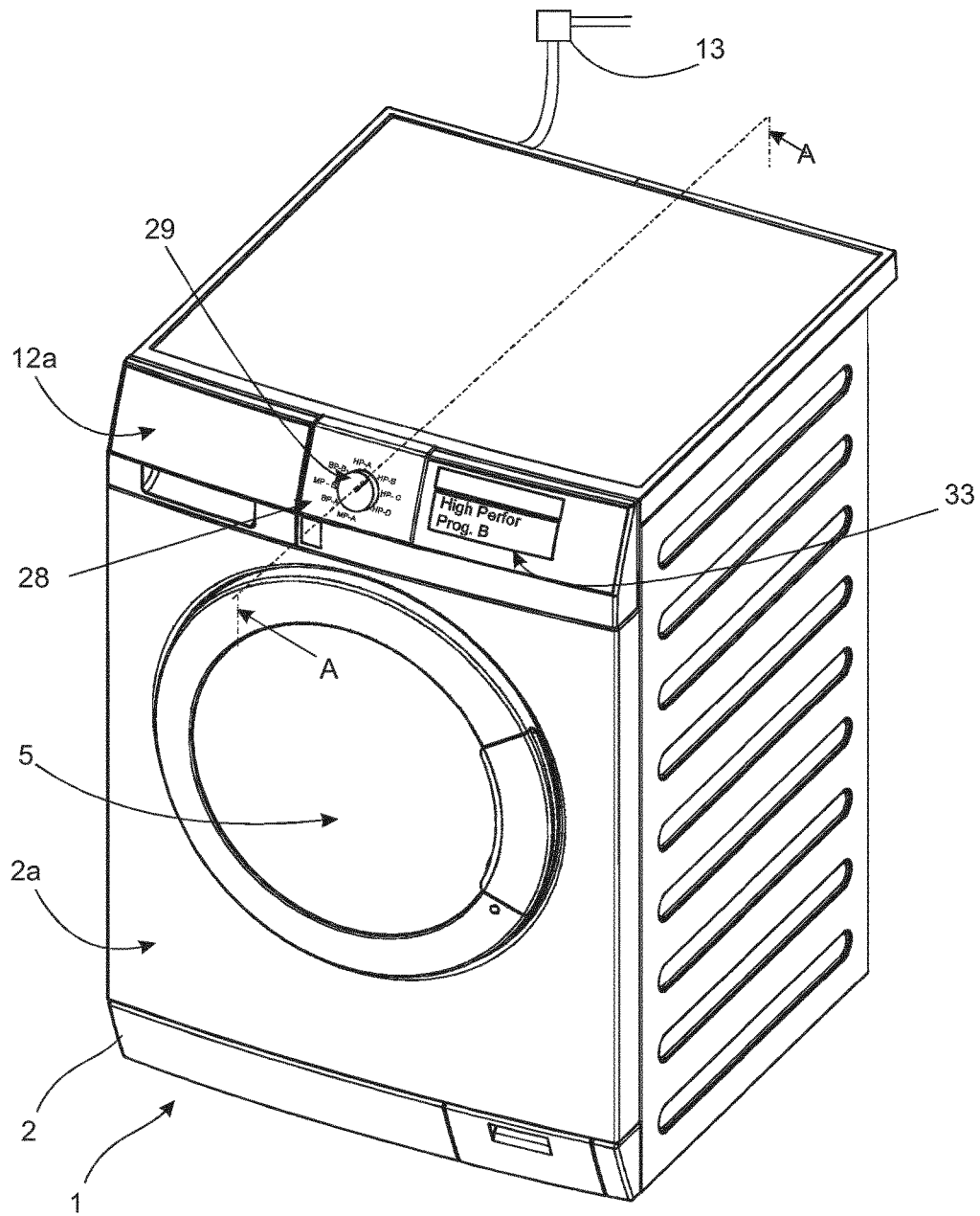
FIG. 1 is a schematic perspective view of a laundry washing machine according to an aspect of the present invention.
Figure 2:
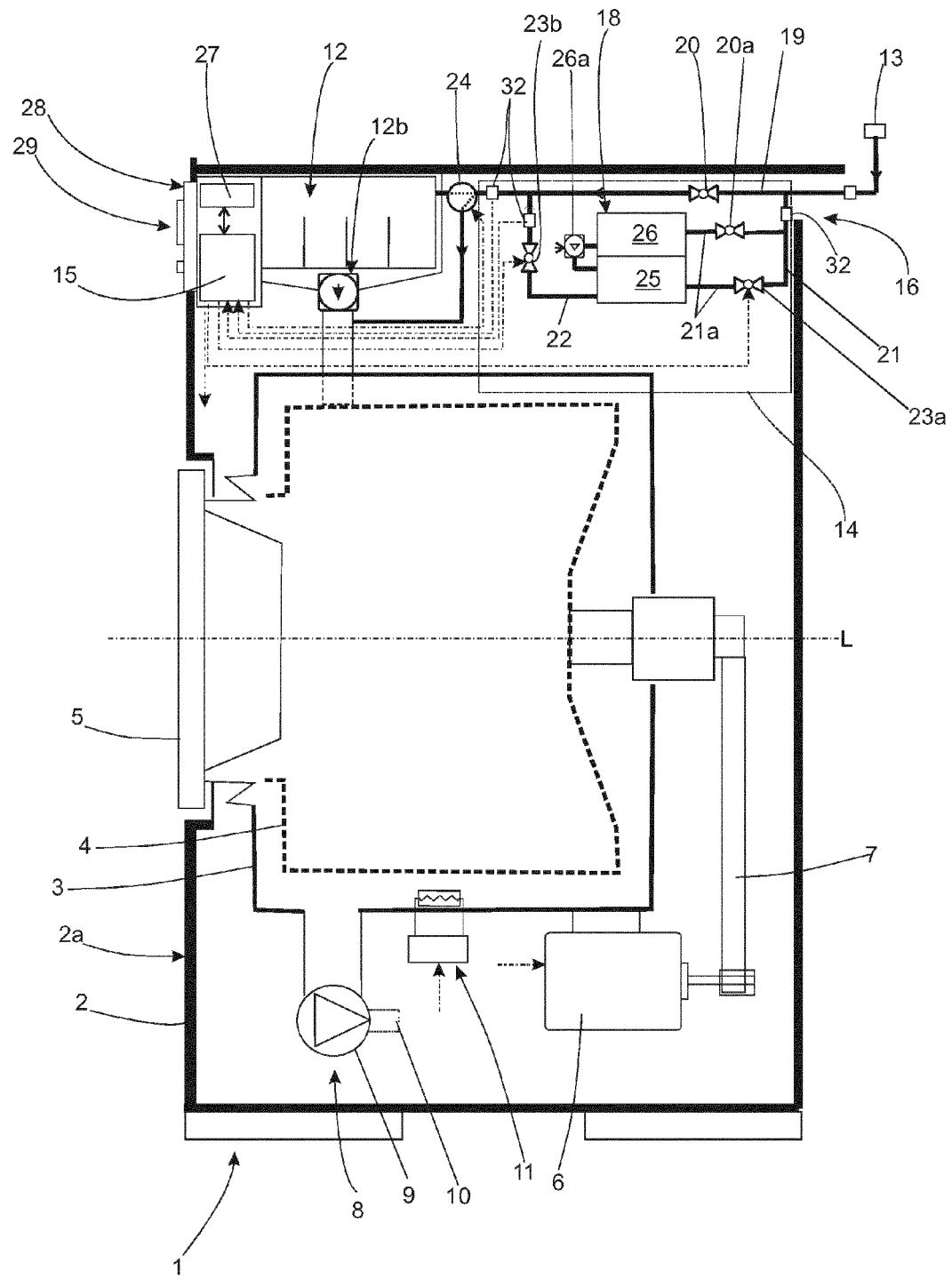
FIG. 2 is a longitudinal cross-sectional schematic view taken along line A-A in FIG. 1, with some parts/components of the machine removed for clarity.

With reference to FIGS. 1 and 2, reference number 1 indicates as a whole a home laundry washing machine which comprises: a preferably, though not necessarily, substantially parallelepiped-shaped, rigid outer boxlike casing 2, which is structured for resting on the floor; a preferably substantially cylindrical, bell-shaped hollow washing tub 3, which is arranged inside the casing 2 with its opening or mouth directly facing a laundry loading/unloading pass-through opening realized in the front wall 2a of boxlike casing 2; a preferably substantially cylindrical, elastically-deformable bellows (not shown) watertight connecting the front opening or mouth of washing tub 3 to the laundry loading/unloading opening realized in the front wall 2a of casing 2; and a substantially cylindrical, bell-shaped revolving perforated drum 4 structured for housing the laundry to be washed, and which is housed in axially rotating manner inside the washing tub 3 so as to be able to freely rotate about its longitudinal reference axis. In an alternative embodiment not shown, rotation axis may be vertical or inclined.

According to one embodiment, the revolving drum 4 is housed in axially rotating manner inside the washing tub 3 with its front opening directly faced/aligned to the laundry loading/unloading opening on the front wall 2a of casing 2, and the drum rotation axis is preferably arranged locally substantially coincident with the substantially horizontally-oriented longitudinal reference axis of washing tub 3. Furthermore in the example shown, the hollow washing tub 3 is preferably suspended in floating manner inside the casing 2 via a suspension system preferably, though not necessarily, comprising a couple of upper coil springs (non illustrated) connecting the upper portion of the washing tub 3 to the top of the boxlike casing 2, and a couple of lower vibration dampers (not illustrated) connecting the bottom portion of the washing tub 3 to the bottom of the boxlike casing 2.

With reference to FIG. 1, the laundry washing machine 1 furthermore comprises a porthole door 5 which is hinged to the front wall 2a of casing 2 to rotate about a preferably, though not necessarily, vertically-oriented reference axis to and from a closing position in which the peripheral border of the porthole door 5 rests completely on front wall for closing the laundry loading/unloading opening and watertight sealing the washing tub 3; and an electrically-powered motor assembly 6 which is structured for driving into rotation the revolving drum 4 about its longitudinal reference axis inside the washing tub 3, by means of a belt/pulley system 7. In a different embodiment of the invention, the motor 6 may be directly associated with the shaft of the revolving drum 4.

With reference to FIG. 2, the laundry washing machine 1 furthermore comprises a water draining system 8 (only partially and schematically illustrated), which is configured to drain the wash water, i.e. dirty water and/or water mixed with washing and/or rinsing products, from the washing tub 3 to the outside. The water draining system 8 may comprise a draining pump 9 (schematically illustrated in FIG. 2), which is fluidly connected to a liquid outlet arranged on the bottom region of the washing tub 3 and is configured to drain the water from the washing tub 3 to supply the drained water into a draining suction pipe 10 (only partially illustrated in broken lines in FIG. 2).

As shown in FIG. 2, the laundry washing machine 1 furthermore comprises a heating device 11 configured to heat the water solution loaded in the washing tub 3 to a prefixed temperature. In accordance with one exemplary embodiment, the heating device 11 may comprise one or more electric resistors or any similar/equivalent heating electric/electronic components which are arranged, for example, in the bottom of the washing tub 3 and/or in a sump of the washing tub 3 in order to heat the water loaded in the washing tub 3.

In this instance, the washing tub 3, the drum 4, the suspension system, the electrically-powered motor assembly 6, the heating device 11, and the water draining system 8 of the laundry washing machine 1 are well-known elements provided in well-known laundry machine and detailed description thereof will be omitted accordingly.

Terminology which will be used as follows is hereinafter defined.

More specifically, "FH" is the unit of measurement of water hardness degree corresponding to French degree, wherein 1 fH=10 ppm CaCO3 (Calcium Carbonate).

With the term fresh water, it will be understood a tap water provided by a water mains 13 usually arranged in a house. It should be understood that water mains 13 generally provides an "hard water", i.e. a water having a hardness degree greater than about 25 FH (250 ppm CaCO3).

With the term "softened water", it will be understood a water provided by a water softener system which will be disclosed in detail afterwards. In order to be effective for washing process the softened water may have an hardness degree lower than about 15 FH (150 ppm CaCO3), preferably lower than 5 FH (50 ppm CaCO3) and more preferably lower than 2 FH (20 ppm CaCO3). More preferably, according to a preferred embodiment, softened water may have an hardness degree lower than about 1 FH (10 ppm CaCO3).

With the term mix water, it will be understood a mixture of fresh water and softened water. Preferably, hardness degree of mix water may be comprised between about 15 and about 25 FH.

With "washing program", it will be understood a laundry washing cycle comprising a "main laundry wash phase", and one or more "secondary laundry wash phases" following the main laundry wash phase, wherein the secondary laundry wash phases may comprise one or more laundry rinse phases and preferably, although not necessarily, at least one laundry spin phase.

The main laundry wash phase may comprises, for example: a wetting phase (step of loading water and detergent into the washing tub), a maintenance phase (step of tumbling the laundry for detergent action) and preferably, although not necessarily, a spin phase (step of spinning the drum). If the program to be performed uses heated water, the main laundry wash phase can further comprise a heating phase (step of switching-on the heating device 11). The main laundry wash phase may further comprises a drain phase (step of draining water). It should be point out that drain phase is the last phase of the main laundry wash phase, and is performed before executing the first rinse phase of the secondary laundry wash phases following the main laundry wash phase.

Rinse phases following the main laundry wash phase, may comprise a water loading phase (loading water into the washing tub), a rinse maintenance phase (tumbling the laundry), a drain phase, and preferably a spin phase.

With "softened water laundry wash phase", it will be understood a laundry wash phase wherein softened water is supplied into the washing tub 3.

With "fresh water laundry wash phase" it will be understood a laundry wash phase wherein only fresh water is supplied into the washing tub 3.

With "mix water laundry wash phase" it will be understood a laundry wash phase wherein mix water is supplied into the washing tub 3.

With "fresh water laundry washing program", it will be understood a laundry washing program wherein all the wash phases comprise the step of supplying fresh water into the washing tub 3.

With "softened water laundry washing program", it will be understood a laundry washing program comprising at least a softened water laundry washing phase or at least a mix water laundry washing phase. Preferably, the main wash phase of a softened water laundry washing program comprises the step of supplying softened water or mix water. Preferably the secondary wash phase of a softened water laundry washing program comprises the step of supplying softened or mix or fresh water.

With "washing performance", it will understood the washing efficiency (sometimes expressed also in term as "soil removal index" or "cleaning index") to remove prefixed amount/kind of stains on fabric following a specific standard procedure where all the key parameters involved in the washing process are prefixed or controlled in a way to guarantee the reproducibility of the washing test. For instance the main prefixed parameters may be: the type and amount of stains, detergent type and amount, fabric load type and amount, inlet water temperature and hardness, temperature of the room, type of cycle. It is known for example that "washing performance" of a laundry washing machine is measured according to known harmonized standards (for instance European standard refer to IEC 60456 5ed) performed on standardized soil strips made with 5 type of prefixed soils (red wine, blood, chocolate, sebum, oil/carbon black). Each type of soil is sensible to one or more washing parameters and will be removed on the basis of the selected parameter. The quantitative evaluation of the soil removal may be done by reflectance measurements (Y value) of each washed soil present in the strip. If more than one strip are used the average Y value of each soil is made. The sum of the average value represents the Y sum value. The same procedure is done for a reference machine. The washing parameters used in the reference machine are fixed and clearly specified in the standard in order to make it a reference. The ratio between the Y sum value for the tested machine and the Y sum value of the reference machine provide the washing performance index. It should to be point out that a difference in washing performances index of 0.03 points are relevant and perceivable by the customer. The ratio between the Y sum value for the tested machine and the Y sum value of the reference machine provide the washing performance index.

Due to the high efficiency in washing performance of the reference machine the ratio between the Y sum value of the machine under evaluation and the reference machine is close to 1.00. A threshold washing performances index ratio of 1.03 is required in European standard for energy label machine declaration. Therefore an increment in washing performances index of 0.03 points is relevant in term of washing performances improvement because is hard to have this level of improvement avoiding the use of additional detergent or washing temperature increasing. The increment of 0.03 points in washing performances index is also clearly perceivable by the customer by simple visual comparison. For this reason an improvement in washing performances index of 0.03 points (or more) has to be considered a solid value to support claims for both technical and customer point of view respectively.

This procedure provides a clear and easy comparison of machines and washing cycles.

With "improved washing performance program", it will understood a laundry washing program characterized by having a washing efficiency measured/calculated in terms of washing performance index being greater than a washing performance index of a "fresh laundry washing program" in the same washing conditions (cycle temperature, detergent, stains, fabric load, etc).

With the term "detergent" it will be understood any kind of laundry cleansing-agent which is supplied into the washing tub 3 during the main wash phase.

As shown in FIG. 2, the laundry washing machine 1 furthermore comprises a detergent dispensing assembly 12, which is housed inside the casing 2 in easily reachable manner by the user, and is structured to supply into the washing tub 3, detergent mixed with water. In one exemplary embodiment, the detergent dispensing assembly 12 may comprise a detergent drawer 12a (illustrated in FIGS. 1 and 2) which may be fitted/inserted in manually extractable manner into a completely recessed drawer housing (not illustrated), which extends substantially horizontally inside the boxlike casing 2, and is manually movable inside the drawer housing between a working position (illustrated in FIG. 1) and an extracted position (not illustrated). It should be understood that detergent dispensing assembly 12 may be structured for selectively spilling/pouring a given amount of fresh water arriving from a fresh water mains 13 directly into the detergent drawer 12a, so as to flush the detergent, out of the same detergent drawer 12a so that detergent mixed with water is loaded into the washing tub 3.

According to an embodiment the detergent dispensing assembly 12 is structured to supply into the washing tub 3 a dosage of detergent previously loaded by the user into the detergent drawer 12a.

However, it should be understood that according to a different embodiment, the detergent dispensing assembly 12 may have an auto-dosing system/structure. i.e. it is provided with an auto-dosing detergent device 12b designed to automatically control the amount of detergent supplied to into the washing tub 3. The auto-dosing detergent device 12b may comprise for example one or more detergent metering pumps (not illustrated), i.e. volumetric pumps for the metered feed of the detergent/water into the washing tub 3 based on control signals.

The laundry washing machine 1 furthermore comprises a water softener system 14, which is arranged inside the casing 2 between the water mains 13 and the detergent dispensing assembly 12, or between the water mains 13 and directly the washing tub 3, and is designed to reduce the hardness degree of the fresh water so as to provide softened water to the detergent dispensing assembly 12 or directly to the washing tub 3.

According to one simplified embodiment, the water softener system 14 may be structured to be activated/controlled so as to operate between a first operating state, wherein it provide softened water, and a second operating state, wherein it provides fresh water. It should be understood however that other kind of water softener systems may be contemplated. As can be appreciated, the present invention can be conveniently applied to a water softener system which may be activated/controlled so as to selectively operate, in addition to the first and second operating states above disclosed, further in a third state wherein it provides mix water.

According to a simplified embodiment, the water softener system 14 may be designed to vary the hardness degree of the softened water and/or mix water, based on received control/command signals.

With regard to an exemplary embodiment illustrated in FIG. 2, the water softener system 14 may comprise a fresh water supply circuit 16, which is arranged inside the casing 2 between the water mains 13 and the detergent dispensing assembly 12 or between the water mains 13 and directly the washing tub 3, and may be structured so as to control/regulate the flow of fresh water from the water mains 13 towards the detergent dispensing assembly 12 and/or the washing tub 3. In accordance to the exemplary embodiment illustrated in FIG. 2, the machine 1 may preferably although not necessarily comprise an electric controlled flow diverter device 24 which is connected between the water softener system 14 and the detergent dispensing assembly 12/the washing tub 3, and is designed to receive fresh or softened or mix water from the water softener system 14 and selectively supply, on command, the received water to the detergent dispensing assembly 12 or the washing tub 3.

However, it should be understood that according to different embodiments, the water softener system 14 may comprise any other known device/system designed to selectively supply the received water to the detergent dispensing assembly 12 or the washing tub 3.

In accordance with one embodiment, the water softener system 14 further comprise an internal water softening device 18, which may be arranged along the fresh water supply circuit 16 between the water mains 13 and the detergent dispensing assembly 12, or the flow diverter device 24 if presents, so as to be crossed by the fresh water flowing from the water mains 13 towards the detergent dispensing assembly 12 or directly towards the washing tub 3, and is structured to reduce the hardness degree of the fresh water drawn from the water mains 13 so as to provide the softened water to be channeled to the detergent dispensing assembly 12 or directly to the washing tub 3.

In accordance with one simplified exemplary embodiment shown in FIG. 2, the fresh water supply circuit 16 may preferably comprise a hosepipe 19 connecting the water mains 13 to the inlet of the detergent dispensing assembly 12 or to the washing tub 3, an electrically-controlled valve 20 which is arranged along the hosepipe 19 and is able to control/regulate the flow of fresh water from the water mains 13 towards the detergent dispensing assembly 12 or to the washing tub 3; a hosepipe 21 connecting the water mains 13 to the inlet of water softening device 18 which in turn has the outlet connected to the hosepipe 19 or directly to the detergent dispensing assembly 12 by means of a hosepipe 22; an electrically-controlled valve 23a, which is arranged along the hosepipe 21 and is designed to control/regulate the flow of fresh water from the water mains 13 towards the inlet of the water softening device 18 based on a control signal in order to cause the water softening device 18 to regulate/reduce the hardness degree of the softened water provided in its outlet; and preferably although not necessarily, an electrically-controlled valve 23b, which may be arranged along the hosepipe 22 and is designed to control/regulate the flow of softened water from the water softening device 18 towards the hosepipe 19. It should be understood that mix water may be provided for example by controlling the electrically-controlled valve 20 and 23b.

The electrically-controlled valves 20 and/or 23a and/or 23b may be on-off electric valves configured to be selectively controlled/activated so as to cause the softened, fresh or mix water to be selectively supplied to the detergent dispensing assembly 12/washing tub 3. It should be understood that electrically-controlled valves 20 and/or 23a and/or 23b may be controlled to selectively regulate the volume (liters) of fresh water crossing the hosepipe 19, and/or crossing the softening device 18 and/or the volume of water that the water softening device 18 provides to the hose 19 in order to mix the fresh water and softened water so as to provide mix water having a determined hardness degree.

The electrically-controlled valves 20 and/or 23a and/or 23b could be controlled so that the hardness degree of the softened or mix water is regulated based on a required value. It should in any case be understood that control of the hardness degree of the water may be not limited to the circuit above disclosed. For example the electrically-controlled valve 20, 23a, 23b may be not limited to on-off electric valves but according to possible different embodiments of the present invention, the electrically-controlled valve 20, 23a, 23b may be proportional valve or other kind of known valve electrically designed to be controlled to regulate a water flow rate.

In accordance with one embodiment shown in FIG. 2, the laundry washing machine 1 may preferably, although not necessarily, comprise an electronic sensing system 32, which may comprise a number of sensor devices arranged along the hosepipes 19, 21, 22 to determine/measure hardness values which are indicative of the hardness degree of: the fresh water provided from the water mains 13 and/or the softened water provided in outlet by the water softening device 18, and/or the fresh/softened/mix water provided by the water softening system 14.

In accordance with the exemplary embodiment shown in FIG. 2, the sensor devices may be conductometric sensors arranged along the hosepipes 19, 21, 22 upstream from the detergent dispensing assembly 12.

According to an embodiment shown in FIG. 2, the water softening device 18 may be a ion-removal device type. In accordance with one exemplary embodiment, the water softening device 18 may comprise a water-softening agent container 25, which is filled with a given amount of ion-exchange resins (not shown) capable to restrain the calcium and/or magnesium ions (Ca++ an Mg++) dissolved in the fresh water flowing across the water-softening agent container 25 and is preferably interposed between the hosepipes 21 and 22 to be crossed by the fresh water flowing from the valve 23a and the hosepipe 21. In accordance with one exemplary embodiment, the water softening device 18 may further comprise a regeneration-agent reservoir 26 which to structured for receiving a given amount (for example half a Kilogram or one Kilogram) of salt grains (Sodium Chloride) and is designed to uses brine (i.e. salty water) to periodically regenerate the ion-exchange resins contained in the water-softening agent container 25. Salty water, in fact, is able to replace from the ion-exchange resins the calcium and magnesium ions previously combined/fixed to the resins with the Sodium ions (Na+).

The internal water softening device 18 may further preferably although not necessarily comprise: a water supply circuit 21a which is structured for selectively channeling, on command, a given amount of fresh water into the water-softening agent container 25 and regeneration-agent reservoir 26 so to at least partly dissolve the salt or other regeneration agents stored therein and form a given amount of brine (i.e. salty water); and a electrically-controlled valve 20a which is arranged along a hosepipe of the water supply circuit 21a and is designed to control/regulate the flow of fresh water from the water mains 13 towards regeneration-agent reservoir 26, an electrically-powered brine-circulating pump 26a which is interposed between the water-softening agent container 25 and the regeneration-agent reservoir 26 and is structured for transferring/moving the brine (i.e. the salty water) from the regeneration-agent reservoir 26 to the water-softening agent container 25 when activated.

Ion-removal internal water softening devices are disclosed, for example, in reference documents WO 2006 079 417 and/or EP 0 861 114 wherein a ion-removal internal water softening device is based on capacitive deionization technology system comprising electrodes having a conductive surface. The electrodes are chargeable in response to an applied DC potential. The electrodes are separated from each other by non-conductive spacers. The electrodes and the conductive surface on the electrodes may be constructed from conductive materials such as carbon or conductive polymers or combinations. Because the electrodes have a limited capacity, the system based on capacitive deionization technology requires regeneration to remove the hardness ions from electrodes. In detail, the system based on capacitive deionization technology system may be regenerated by flushing with fresh water, short-circuiting the anode electrodes with the cathode electrodes or by reversing the polarity or by a combination thereof. The interval for regeneration is also dependent on the concentration of ions in the feed water; the harder the feed water, the more frequent regeneration is required. The water produced during regeneration contains a high level of hardness (ions) and is therefore directed to a waste outlet. The system based on capacitive deionization technology thereby provides water softening without the addition or with a limited amount of chemicals for regeneration.

It should in any case be understood that water softening device 18 is not limited only to ion-removal devices type, but according to other possible embodiments of the present invention, it may comprise any kind of device/apparatus operating according to known water softening technologies. In accordance with an exemplary embodiment (not illustrated), the water softening device 18 may comprise: reverse osmosis systems/devices, nano-filtration systems/devices, distillation systems/devices such as membrane distillation systems/devices, boiling systems/devices, capacitive deionization systems/devices, electro-dialysis systems/devices and similar, enzymatic systems which are known and detailed description thereof will be omitted accordingly.

As illustrated in FIGS. 1, 2, 3, 5 and 7, the laundry washing machine 1 may further comprise a user control panel 28, which may be preferably, although not necessarily arranged in the front wall 2a of the casing 2 and is structured/configured to allow the user to input information being indicative of a improved washing performance program to be performed. The user control panel 28 may preferably comprise, for example, a LED or LCD or fluorescent type display or the like, and/or preferably acoustic devices designed to generate vocal/acoustic messages.

As illustrated in FIG. 2, the laundry washing machine 1 may further comprise an electronic control unit 15 which may be electrically connected to the control panel 28 in order to receive the information inputted by the user.

In accordance with a first embodiment shown in FIG. 3, the control panel 28 may be structured/configured to allow the user to select a laundry washing program among one or more of preset improved washing performance programs. Preferably, improved washing performance programs may comprise: basic performance cotton program, at least one intermediate performance cotton program, high performance cotton program, basic performance polyester program, at least an intermediate performance polyester program, high performance polyester program, basic performance polyamide program, at least an intermediate performance polyamide program, high performance polyamide program, basic performance delicates program, at least one intermediate performance delicates program, high performance delicates program, basic performance wool program, at least one intermediate performance wool program, high performance wool program, or the like.

Data relating to selectable/performable improved washing performance program/s may be preferably contained in a memory device 27 or any similar apparatus cooperating with the electronic control unit 15, and may comprise information associated with the kind of water (softened/fresh/mix), and/or hardness degree of the water to be supplied during each laundry washing phases of a improved washing performance program.

FIG. 4 illustrates a table which comprises on a column a number of improved washing performance programs A, B, C . . . , N which could be implemented by the machine 1.

As shown in FIG. 4, improved washing performance programs may be preferably configured so that: during the main wash phase, the softener system 14 is activated/controlled in the first operating state in order to provide/supply a softened water so as to perform a softened water laundry wash phase or a mix water laundry wash phase, whereas during the secondary washing phase following the main wash phase i.e. the rinses phases and preferably the spin phase, the softener system 14 is controlled in order to selectively operate in the first or second or third state so as to provide softened, or fresh or mix water, respectively in order to perform softened water washing phase, or fresh water washing phase or the mix water washing phase, respectively.

Preferably, one or more improved performance washing programs may be programmed so that the first rinse phase is a mix or softened water laundry wash phase, whereas other performable improved performance washing programs may be programmed so that the last rinse phase is a fresh water washing phase (Basic performance improved washing program A in FIG. 4).

Preferably, one or more improved performance washing programs may be programmed so as to perform a fresh water laundry washing phase during the main wash phase, and one or more mix water laundry washing phase/s and/or one or more softened water laundry washing phases during the secondary wash phases (Basic performance washing program N in FIG. 4).

Preferably, one or more improved performance washing programs may be programmed so as to perform a mix or softened water laundry washing phase during the main wash phase, and one or more mix or softened or fresh water laundry washing phase/s during the secondary wash phases (Basic performance washing program A, High performance washing program N in FIG. 4).

Preferably, one or more improved performance washing programs may be programmed so as to perform softened water laundry washing phases during the main and the second wash phases (High performance washing program N in FIG. 4).

According to an exemplary embodiment, a basic performance cotton washing program may comprise at least a mix or softened water laundry wash phase. For example, according to the embodiment illustrated in FIG. 4, memorized data of the basic performance cotton washing program may comprise the following information: the main wash phase is a mix water laundry wash phase, the first rinse phase is a fresh water laundry wash phase, the second rinse phase is a fresh water laundry wash phase, the final rinse phase is a fresh water laundry wash phase.

According to a further exemplary embodiment illustrated in the table of FIG. 4, memorized data of a high performance cotton washing program may comprise the following information: the main wash phase is a softened water laundry wash phase, the first rinse phase is a softened water laundry wash phase, the second rinse phase is a softened water laundry wash phase, and the final rinse phase is a softened water laundry wash phase. It should be point out that selectable/performable improved washing performance program/s may further comprise one or more intermediate performance cotton washing programs, wherein at least a wash phase of the program is a mix or a softened water laundry wash phase, whereas the others wash phases of the program may comprise softened or mix or fresh water laundry wash phases. Of course the softened, mix and fresh water laundry wash phases may have any prefixed sequence in the program.

According to a different exemplary embodiment, memorized data of a basic performance polyester washing program may comprise at least a mix or softened water laundry wash phase. For example, according to the embodiment illustrated in FIG. 4, the basic performance polyester washing program may comprise the following information: the main wash phase is a fresh or mix water washing phase, the first rinse phase is a fresh or mix water washing phase, the second rinse phase is a fresh or mix water washing phase, and the final rinse phase is a fresh or mix water washing phase.

According to a different exemplary embodiment, memorized data of a high performance polyester washing program may comprise the following information: the main wash phase may be a softened water washing phase, the first rinse phase may be a softened water washing phase, second rinse phase may be a softened water washing phase, and the final rinse phase may be a softened water washing phase. It should be point out that selectable/performable improved washing performance program/s may further comprise one or more intermediate performance polyester washing programs, wherein at least a wash phase of the program is a mix or a softened water laundry wash phase, whereas the others wash phases of the program may comprise softened or mix or fresh water laundry wash phases. Of course the softened, mix and fresh water laundry wash phases of a intermediate performance polyester washing program may have any prefixed sequence.

According to a different exemplary embodiment, memorized data of a basic performance polyamide washing program may comprise at least a mix or softened water laundry wash phase. For example, according to the embodiment illustrated in FIG. 4, basic performance polyamide washing program may comprise the following information: the main wash phase is a mix water washing phase, the first rinse phase is a fresh water washing phase, second rinse phase is a fresh water washing phase, and the final rinse phase is a fresh water washing phase.

According to a different exemplary embodiment, memorized data of a high performance polyamide washing program may comprise the following information: the main wash phase may be a softened water washing phase, the first rinse phase may be a softened water washing phase, second rinse phase may be a softened water washing phase, and the final rinse phase may be a softened water washing phase. It should be point out that selectable/performable improved washing performance program/s may further comprise one or more intermediate performance polyamide washing programs, wherein at least a wash phase of the program is a mix or a softened water laundry wash phase, whereas the others wash phases of the program may comprise softened or mix or fresh water laundry wash phases. Of course the softened, mix and fresh water laundry wash phases of an intermediate performance polyamide washing program may have any prefixed sequence.

Figure 5:
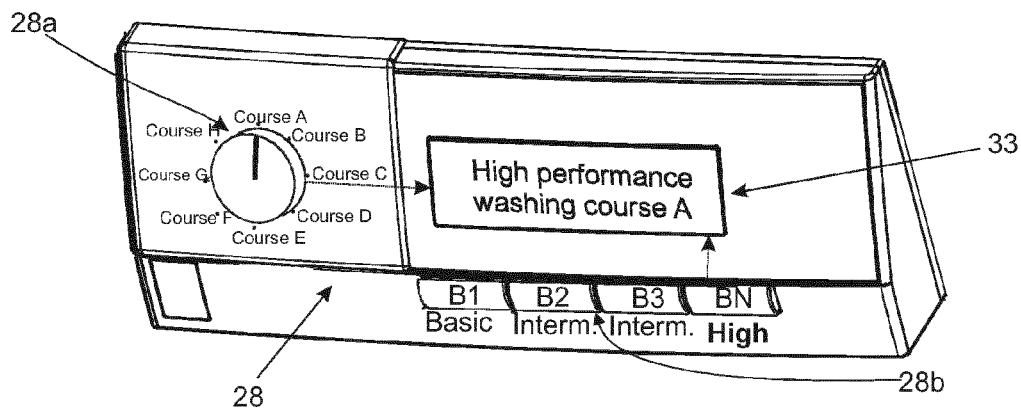
FIG. 5 schematically illustrates a second embodiment of an user control panel of the laundry washing machine illustrated in FIG. 1.

In accordance with a different embodiment shown in FIG. 5, the washing machine 1 may be provided with a control panel 28 structured/configured to allow the user to input first information indicative of a fresh water washing program to be performed, and second information indicative of one or more performance commands. The electronic control unit 15 may be configured to determine/set the improved washing performance program based on received first and second information.

The control panel 28 may be configured to allow operator to input said second information indicative of a level of the washing performance required. Preferably, the control panel 28 may be configured to allow operator to input said second information indicative of a level of performance comprised in a list of selectable performance levels, such as basic washing performance level, one or more intermediate washing performance levels, and a high washing performance level.

The electronic control unit 15 may be configured to set/determine the improved washing performance program based on the selected fresh water laundry washing program and said performance level selected by the user.

In accordance with the exemplary embodiment shown in FIG. 5, the control panel 28 may comprise a first select part 28a configured to allow the user to select a fresh water washing program among one or more fresh water washing programs; and a second select part 28b is configured to allow the user to input one washing performance level among a plurality of washing performance levels.

The information associated with the fresh water washing programs selected by the first select part 28a may be contained in form of data memorized in the memory device 27. According to the embodiment illustrated in FIG. 5, the electronic control unit 15 may be configured to determine/set the improved washing performance program to be performed, based on the first information indicating the selected fresh water washing program and the second information relating to the performance level selected by user.

In usage, during the improved washing performance program, the electronic control unit 15 activates/controls the water softening system 14 (depending on the kind of softening system 14 presents on the machine 1) based on the set improved washing performance program to cause softened water or mix or fresh water to be supplied during at least the main wash phase and/or one or more secondary laundry washing phase/s of the fresh water washing program.

As shown in the example of FIG. 5, the first select part 28a may comprise a rotation knob for supplying the selected signal containing the first information after sensing whether a program is selected through rotation, whereas the second select part 28b may comprise one or more buttons B1, B2, B3, . . . , BN for supplying the selected signal containing the second information after sensing the level of performance that user has selected. It should in any case be understood that the first select part 28a and second select part 28b are not limited to the example illustrated in FIG. 5, but could comprise other kind of known input devices such as, for example, a touch panel/s or like.

Figure 6:
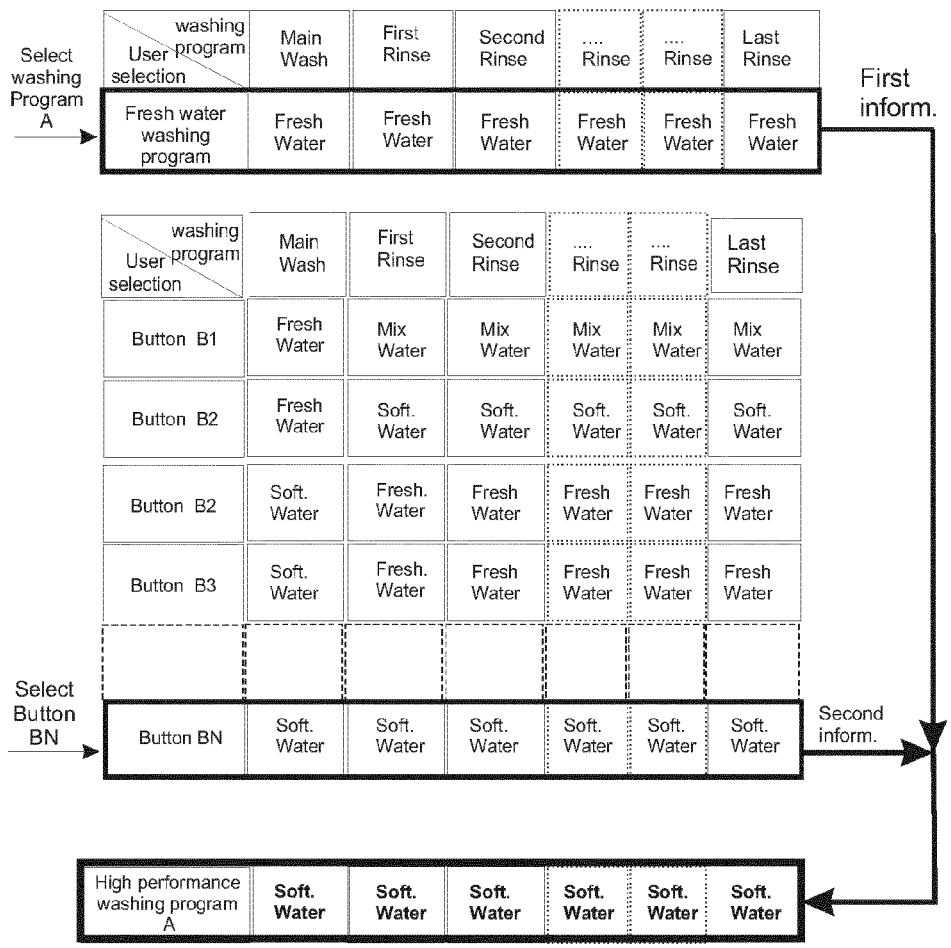
FIG. 6 shows an example of a table containing improved performance washing programs selectable by the control panel illustrated in FIG. 5.

In the example shown in FIGS. 5 and 6, if the buttons B1, B2, B3 . . . BN are not pushed, the electronic control unit 15 may set the "standard" fresh-water washing program so as to load the fresh water during all the washing phases of the fresh-water washing program.

When one button B1, . . . ,B3, . . . BN is pushed, the electronic control unit 15 modifies the fresh water washing program in the "improved washing performance program" by changing/switching/replacing the kind of water to be supplied during the washing phases. Kind of water (mix or softened or fresh) to be supplied during the washing phases, may be determined by the electronic control unit 15 on the basis of the pushed button B1, . . . ,B3, . . . BN.

For example, button B1 may be associated with the basic level of washing performance and when pushed may be cause the mix water to be supplied during the main wash phase; buttons B2 may be associated with a specific intermediate level (for example the second level) of washing performance and when pushed may cause the softened water to be supplied during the main wash phase, whereas button BN may be associated with high level of washing performance (top level) and when pushed may cause the softened water to be supplied during all phases of the selected program.

It should be point out that according to a possible embodiment, the electronic control unit 15 and control panel 28 may be configured in order that the user may change the kind of water (mix or softened or fresh) so as to set improved washing performance program, by repeatedly pressing a determined button a prefixed number of times. For example, pressing repeatedly the button B1 twice may cause the softened water to be supplied during the main wash phase, pressing repeatedly the button B2 twice may cause the softened water to be supplied during the first rinse phase, pressing repeatedly the button B3 twice may cause the softened water to be supplied during the second rinse phase. For example, the control panel 28 may be configured so that button B1, BN may cause selection of any prefixed combination of mix or softened or fresh water in washing phases.

Of course, according to a different embodiment, the control panel 28 may have one button and be configured so that change of kind of water (mix or softened or fresh) in washing phases may be determined based on number of time that button is repeatedly pressed.

Applicant implemented several washing tests in order to compare the washing performance index achieved by performing a fresh water washing program with the washing performance index achieved by performing an improved washing performance program according to aspects of the present invention.

For example, FIG. 10 illustrates a table which comprises washing data results of a "Cotton full load" performed by a fresh water washing program comprising only fresh water washing phases (column 2 of the table 10) and washing data results of a "Cotton full load" performed by an improved washing performance cotton program comprising only softened water washing phases (column 3 of the table 10). More specifically, both washing cotton programs are performed in the following washing condition: full load i.e. 9 Kg of cotton load, washing temperature of 33° C., a cycle time duration of 235 minutes, and a detergent amount of 148 g. Applicant found that, the performance index of the fresh water washing program is 1.04 whereas the performance index of the improved washing performance program is conveniently improved, i.e. is 1.15 (Standard IEC 60456). In other words Applicant found that by performing the high performance cotton program according to the above reported washing condition, the performance index is increased of 0.11. In this regard, it is stressed on the fact that, as above disclosed, the performance index of "0.11" is a very high value which is conveniently achieved without using additional detergent or washing temperature increasing.

On the other hand, FIG. 11 illustrates a table which comprises washing data results of a "Cotton half load" performed by a fresh water washing program characterized by carrying out only fresh water washing phases (column 2 of the table 11) and washing data results of a "Cotton 0 half load" performed by an improved washing performance program which is characterized by carrying out only softened water washing phases (column 3 of the table 11). More specifically, both washing programs are performed in the following washing condition: half load i.e. 4.5 Kg of cotton, washing temperature of 27° C., and a detergent amount of 94 g. Applicant found that in such washing condition performance index of the fresh water washing program is 1.05 whereas performance index of the improved washing performance program is 1.12 (Standard IEC 60456). It is point out that even in half load condition, improved washing performance program performed according to the present invention allows to obtain a significant increasing of the performance index.

FIGS. 7 and 8 illustrate a third exemplary embodiment which differs from the second embodiment because the first select part 28a is configured to allow the user to select a laundry washing program among a plurality of softened water washing programs, and the second select part 28b is configured to allow the user to select a performance command/levels so as to further improve the washing efficiency of the selected softened water washing program.

Information about softened water washing programs may be contained in memory device 27 and comprise data relating to kind of water (softened, mix and fresh water) to be supplied during the washing phases.

The electronic control unit 15 may be configured to set the improved washing performance program based on the first information indicating the selected softened water washing program and the second information relating to the performance command/levels that user has requested by means of the second select part 28b.

Preferably, the improved performance washing program set by the electronic control unit 15 comprises substantially the softened laundry washing phases of the selected softened water washing program and one or more prefixed softened or mix water washing phases which replace mix or respectively fresh water washing phases of the selected softened water washing program.

As shown in the example of FIG. 7, the first select part 28a may comprise a rotation knob, whereas the second select part 28b may comprise at least one button for supplying the selected signal containing the second information containing performance command/levels. In the example shown in FIGS. 7 and 8, if the button is not pushed, the electronic control unit 15 may perform the softened water washing program selected by user, so as to load the softened water during the prefixed laundry washing phases.

On the contrary, when the button is pushed, the electronic control unit 15 modifies the softened water washing program so as to define a prefixed "high performance washing program" to be performed, for example by changing the mix water washing phase or a fresh water washing phases with a prefixed softened or respectively a prefixed mix washing phases, and controls the water softening system 14 based on the set high performance washing program.

It should be point out that according to a possible embodiment, the electronic control unit 15 and control panel 28 may be configured in order that the user may increase the level of washing performance, by repeatedly pressing a determined button a prefixed number of times. For example pressing repeatedly the button twice may cause the softened water washing program to be modified in a medium performance washing program. In that case, for example, the electronic control unit 15 may change the fresh water supplied during a prefixed wash phase of the softened water washing program with a mix water. For example pressing repeatedly the button three times may cause the softened water washing program to be modified in a high performance washing program. In that case, for example, the electronic control unit 15 may change the mix water supplied during a prefixed wash phase of the softened water washing program with a softened water.

Figure 9:
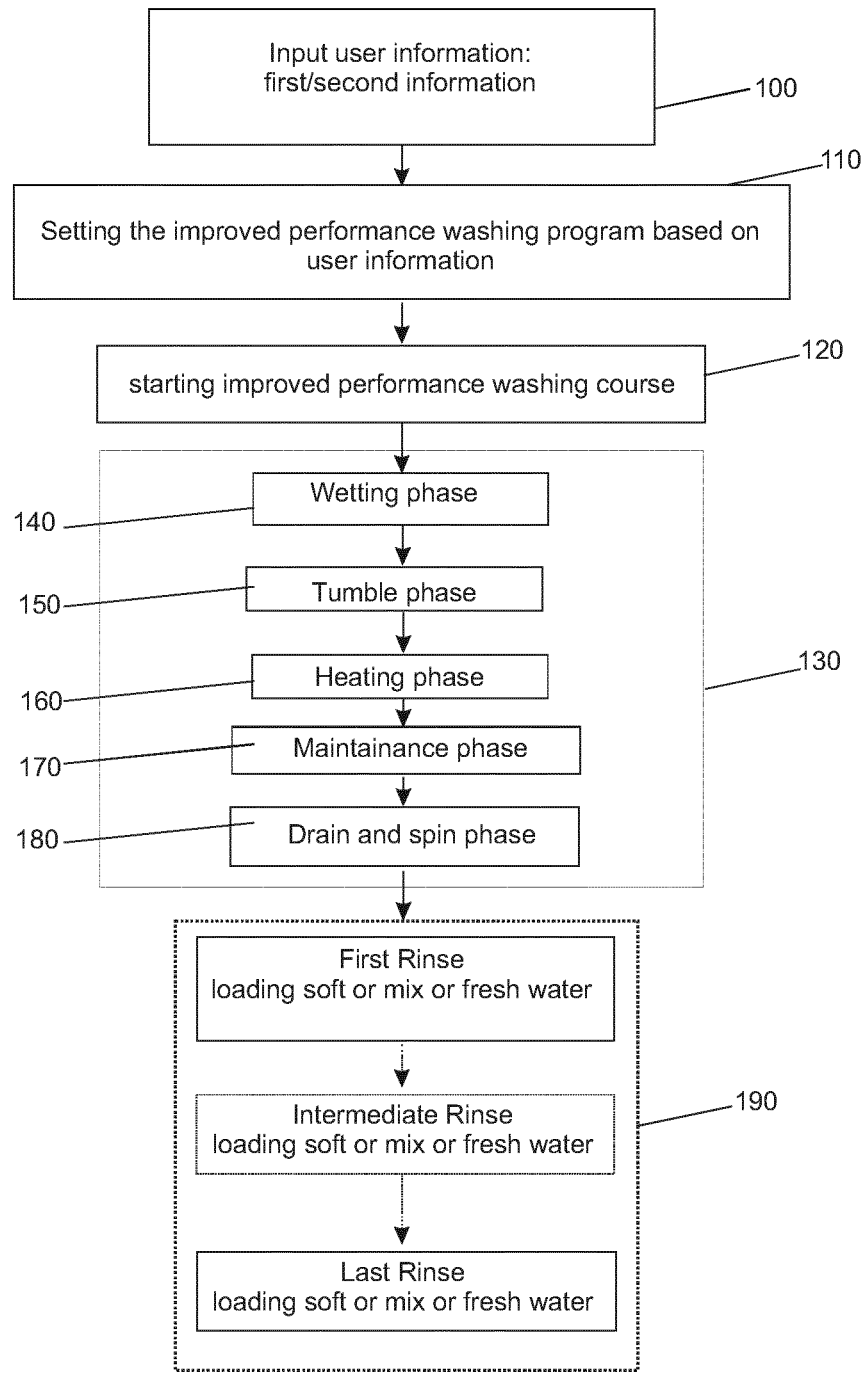
FIG. 9 is a flow chart containing the operation performed by the laundry washing machine of an aspect of the present invention.

Next, the operation performed by laundry washing machine 1 according to aspects of the present invention will be explained in FIG. 9 which illustrates an outline operation flow chart.

In step 100, user inputs via the control panel 28 the information indicative of the improved performance washing program to be performed. As above disclosed, in this step user could select directly the improved washing performance program among one or more prefixed washing programs as illustrated in the example of FIGS. 1 and 3, or inputs the first and second information as illustrated in the second embodiment illustrated in FIG. 5 or in the third embodiment illustrated in FIG. 7. The electronic control unit 15 determines in the memory device 27 all data/information about the kind of water (softened or mix or fresh water) and/or the prefixed hardness of the water, to be supplied during each laundry washing phase, i.e. main wash phase and the rinse phases of the selected improved washing performance program, based on the received information concerning improved performance washing program (step 110).

After that, in step 120, electronic control unit 15 may start performing the main wash phase of the improved washing performance program (step 130). Hereinafter, it will be supposed that user has selected an improved performance washing program, wherein the main wash phase is performed by using softened water, and the secondary wash phases uses softened water.

During the wetting step (step 140) of the main wash phase, the electronic control unit 15 activates/controls the softener system 14 so as to supply a softened water into the detergent dispensing system 12 to cause the detergent to be flushed from the detergent dispensing system 12 into the washing tub 3. At this time, the electronic control unit 15 may preferably although not necessarily control the valves 20, and/or 23a and/or 23b so as to selectively regulate flows/volumes of fresh water crossing the hosepipes 19, 21 and 22 and passing through the water softening agent container 25, based on the amount of softened water to be supplied and/or the hardness degree of the softened water. Preferably although not necessarily, if the laundry washing machine 1 comprises an electronic sensing system 32, the electronic control unit 15 may control the valves 20, and/or 23a and/or 23b based on a comparison between the prefixed hardness degree and the measured water hardness degree. Of course, if the auto-dosing device 12b is present, the electronic control unit 15 may control the auto-dosing device 12b to automatically supply a prefixed detergent amount into the washing tub 3. In one embodiment, the main wash phase may comprise a drum tumbling step, wherein electronic control unit 15 controls the electric motor assembly 6 so as to rotate the drum 4 such that the laundry is tumbled/wetted and detergent is dissolved in the softened water loaded in the tub 3 (step 150). In this step, the electronic control unit 15 may further control the softener system 14 in order to supply softened water directly to the washing tub 3 until a prefixed water level is reached. In one embodiment electronic control unit 15 could control the flow diverter, if present, to supply softened water directly to the washing tub 3.

After the prefixed water level is reached, the electronic control unit 15 may continue to control the rotation of the drum 4 to perform the tumbling movements of the laundry inside of the drum 4 (step 150) and preferably starts heating step wherein it preferably controls the heating device 11 (step 160).

Next, in step 170, the electronic control unit 15 preferably switches off the heating device 11 if the latter is on, and starts performing a maintenance phase wherein the rotation of drum 4 is controlled in order to perform the tumbling movements of the laundry inside of the drum 4.

Next, in step 180, the main wash phase performs drain and preferably, although not necessarily spin steps. In the drain step, the electronic control unit 15 controls the water draining system 8 to drain the washing water from the washing tub 3, whereas in the spin step the electronic control unit 15 preferably controls the motor assembly 6 so as to spin the drum 4 at high speed one or more times.

After performing the drain and spin steps, in step 190, the electronic control unit 15 performs a prefixed number of rinse phases during which the electronic control unit 15 may activate/control the water softener system 14 in order to selectively supply softened, or mix, or fresh water to the washing tub 3 according to the selected/set improved washing performance program. Therefore, when it is required high performance (level), the electronic control unit 15 may activate/control the softener system 14 to supply softened water in any rinse phase (Button BN pushed in the example illustrated in FIG. 5), whereas on the contrary, if intermediate performance (level) is required the electronic control unit 15 may control the softener system 14 to selectively supply mix or fresh water during the rinse phases. In accordance with one embodiment, rinse phases performed after the main wash phase may comprise the step of selectively supplying soft or mix or fresh water to the washing tub 3 preferably, although not necessarily, through a main wash compartment (not illustrated) of the detergent dispensing assembly 12. The first rinse phase may also comprise a rinse maintenance step, wherein the electronic control unit 15 controls the motor assembly 6 in order to rotate the drum 4 so that the laundry is tumbled inside the drum 4, and a drain and spin step wherein the rinse water is removed from the laundry.

It has thus been shown that the present invention allows all the set objectives to be achieved.

While the present invention has been described with reference to the particular embodiments shown in the figures, it should be noted that the present invention is not limited to the specific embodiments illustrated and described herein; on the contrary, further variants of the embodiments described herein fall within the scope of the present invention, which is defined in the claims.

The invention claimed is:

1. A laundry washing machine comprising:
   an outer casing;
   a washing tub arranged inside the outer casing;
   a rotatable drum arranged in an axially rotating manner inside the washing tub and configured to receive laundry to be washed;
   a detergent dispensing assembly configured to supply laundry detergent into the washing tub;
   a water softening system configured to receive fresh water from a water main and reduce the hardness degree of the fresh water, the water softening system configured to:
      supply softened water to the detergent dispensing assembly and/or to the washing tub, during one or more softened water laundry washing phases, and supply mix water to the detergent dispensing assembly and/or to the washing tub, during one or more mix water laundry washing phases, said mix water being a mixture of fresh water and softened water;

a control panel configured to allow an operator to input information associated with washing performance based on soil removal; and an electronic controller configured to control said water softening system in order to perform a washing program comprising:

the one or more softened water laundry washing phases when said input washing performance information is determined to be associated with the softened water, and the one or more mix water laundry washing phases, when said input washing performance information is determined to be associated with the mix water.

2. The laundry washing machine according to claim 1, wherein said control panel is configured to allow the operator to select washing program among one or more predetermined improved washing performance programs, wherein the one or more predetermined improved washing performance programs comprise the one or more softened water laundry washing phase/s and/or the one or more mix water laundry washing phase/s.

3. The laundry washing machine according to claim 2, wherein said washing program comprises a main laundry wash phase and one or more secondary laundry wash phases following the main laundry wash phase; said main laundry wash phase comprises at least a wetting phase, a maintenance phase and a drain phase; said one or more secondary laundry wash phases comprising one or more rinse phases which start after an end of said drain phase of the main laundry wash phase.

4. The laundry washing machine according to claim 3, wherein said one or more predetermined improved washing performance programs comprise: performing a fresh water laundry washing phase during the main wash phase, and performing the one or more mix water laundry washing phase/s and/or the one or more softened water laundry washing phases during the one or more secondary laundry wash phases.

5. The laundry washing machine according to claim 3, wherein said one or more predetermined improved washing performance programs comprise: performing a mix water laundry washing phase or the one or more softened water laundry washing phases during the main wash phase, and performing one or more of the mix water laundry washing phase or the one or more of the softened water laundry washing phases or a fresh water laundry washing phase/s during the one or more secondary laundry wash phases.

6. The laundry washing machine according to claim 3, wherein an improved washing performance program comprises performing the one or more softened water laundry washing phases during the main and the one or more secondary laundry wash phases.

7. The laundry washing machine according to claim 2, comprising a memory device containing data relating to the one or more improved washing performance programs, said memorized data being indicative of loading of softened water, or fresh water, or mix water to the detergent dispensing assembly and/or the washing tub during laundry washing phases of said one or more predetermined improved washing performance programs;

said electronic controller being configured to selectively control/activate said water softening system based on the memorized data associated with a selected one of the one or more predetermined improved washing performance programs.

8. The laundry washing machine according to claim 2, wherein said control panel comprises:

a first select part configured to allow the operator to input first information indicative of a laundry washing program;

a second select part configured to allow the operator to input second information indicative of a washing performance level;

said electronic controller being configured to determine/set a selected one of the one or more predetermined improved washing performance programs to be performed based on the first information and the second information.

9. The laundry washing machine according to claim 8, wherein said first select part is configured to allow the operator to select a fresh water laundry washing program comprising only fresh water washing phases;

said second select part being configured to allow the operator to input said second information indicative of the washing performance level;

said controller being further configured to set the selected one of the one or more predetermined improved washing performance programs based on the selected fresh water laundry washing program and said washing performance level.

10. The laundry washing machine according to claim 9, wherein said electronic control controller is further configured to determine/set the selected one of the one or more predetermined improved washing performance programs by modifying one or more of the fresh water washing phases of the selected laundry washing program with respective softened water washing phases and/or the one or more mix water laundry washing phases, based on said washing performance level; and control said water softening system in response to the selected one of the one or more predetermined improved washing performance programs.

11. The laundry washing machine according to claim 8, wherein said first select part is configured to allow the operator to select a softened water laundry washing program comprising at least the one or more softened water laundry washing phases or at least the one or more mix water laundry washing phases;

said second select part being configured to allow the operator to input said second information indicative of the washing performance level;

said electronic controller being further configured to set the selected one of the one or more predetermined improved washing performance programs based on the selected softened water laundry washing program and said washing performance level.

12. The laundry washing machine according to claim 11, wherein said electronic controller is further configured to determine/set the selected one of the one or more predetermined improved washing performance program by modifying the one or more mix water laundry washing phases or the fresh water washing phases of the selected softened water laundry washing program with respective softened water washing phases and/or the one or more mix water laundry washing phases, based on said washing performance level; and control said water softening system in response to the set selected one of the one or more predetermined improved washing performance programs.

13. The laundry washing machine according to claim 1, wherein the softened water supplied by the water softening system has a reduced hardness degree which is lower than about 15 FH.

14. The laundry washing machine according to claim 1, wherein the softened water supplied by the water softening system has a reduced hardness degree which is lower or equal than about 5 FH.

15. The laundry washing machine according to claim 1, wherein the softened water supplied by the water softening system has a reduced hardness degree which is lower or equal than about 2 FH.

16. The laundry washing machine according to claim 1, wherein the softened water supplied by the water softening system has a reduced hardness degree which is lower or equal than about 1 FH.

17. The laundry washing machine according to claim 1, wherein the mix water supplied by the water softening system has a reduced hardness degree which is greater than, or equal to about 15 FH, and lower than, or equal to about 25 FH.

18. The laundry washing machine according to claim 1, wherein said water softening system comprises a water-softening agent container, which is filled with a given amount of ion-exchange resins capable to restrain calcium and/or magnesium ions dissolved in fresh water flowing across the water-softening agent container, and a regeneration-agent reservoir which is structured for receiving a given amount of salt grains and is designed to uses brine to periodically regenerate said ion-exchange resins contained in said water-softening agent container.

19. The laundry washing machine according to claim 1, wherein the water softening system comprises at least a system based on capacitive deionization technology.

20. The laundry washing machine according to claim 2 wherein said one or more predetermined improved washing performance programs have a washing efficiency measured/calculated in terms of washing performance index being greater than a washing performance index of a fresh water laundry washing program.

21. The laundry washing machine according to claim 1 wherein the electronic controller is configured to control said water softening system based on said input washing performance information, and to supply water to the detergent dispensing assembly and/or to the washing tub during all the washing phases, wherein said supplied water has a hardness degree lower than said fresh water.

* * * * *